United States Patent
Zhu et al.

(10) Patent No.: US 9,704,519 B1
(45) Date of Patent: Jul. 11, 2017

(54) SORTING OF HAMR READ/WRITE HEADS BASED ON READER AND WRITER WIDTHS

(71) Applicant: Seagate Technology LLC, Cupertino, CA (US)

(72) Inventors: Wenzhong Zhu, Apple Valley, MN (US); Edward Charles Gage, Lakeville, MN (US); Alfredo Sam Chu, Prior Lake, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/040,701

(22) Filed: Feb. 10, 2016

(51) Int. Cl.
| | |
|---|---|
| *G11B 11/00* | (2006.01) |
| *G11B 5/455* | (2006.01) |
| *G11B 5/00* | (2006.01) |
| *G11B 5/31* | (2006.01) |
| *G11B 5/48* | (2006.01) |
| *G11B 11/105* | (2006.01) |
| *G11B 5/60* | (2006.01) |

(52) U.S. Cl.
CPC .............. *G11B 5/455* (2013.01); *G11B 5/314* (2013.01); *G11B 5/48* (2013.01); *G11B 5/6088* (2013.01); *G11B 11/10543* (2013.01); *G11B 2005/0016* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,696,831 B2 * | 2/2004 | Nozu | G01R 33/1207 324/210 |
| 6,947,871 B2 | 9/2005 | Deng et al. | |
| 7,046,471 B2 * | 5/2006 | Meyer | G11B 5/012 360/75 |
| 7,123,428 B2 | 10/2006 | Yeo et al. | |
| 7,525,307 B2 | 4/2009 | Shen | |
| 8,045,281 B2 * | 10/2011 | Cho | G11B 20/10009 360/31 |
| 8,395,857 B2 * | 3/2013 | Zhang | G11B 5/455 360/31 |
| 9,093,119 B1 * | 7/2015 | Hwang | G11B 20/20 369/13.33 |
| 9,401,161 B1 * | 7/2016 | Jury | G11B 5/3974 360/75 |
| 2008/0157760 A1 * | 7/2008 | Shen | G01R 33/1207 324/210 |

* cited by examiner

*Primary Examiner* — Tan X Dinh
(74) *Attorney, Agent, or Firm* — Hollingsworth Davis, LLC (57) ABSTRACT

For each head in a collection of heat-assisted magnetic recording read/write heads, a reader width and a writer width is measured. A predicted life is determined for each head based on the respective reader width and writer width. In a first set of drives having relatively fewer heads per drive, a first subset of the heads having a higher value of the predicted life are used. In a second set of drives having relatively more heads per drive, a second subset of the heads having a lower value of the predicted life are used.

20 Claims, 8 Drawing Sheets

| | |
|---|---|
| Wide writer width<br>Narrow reader width<br>Sort A<br>Drives with least number of heads | Wide writer width<br>Wide reader width<br>Sort B<br>Drives with middle number of heads |
| Narrow writer width<br>Narrow reader width<br>Sort B<br>Drives with middle number of heads | Narrow writer width<br>Wide reader width<br>Sort C<br>Drives with most number of heads |

SORTING OF HAMR READ/WRITE HEADS BASED ON READER AND WRITER WIDTHS

SUMMARY

The present disclosure is related to sorting of heat-assisted magnetic recording (HAMR) read/write heads based on reader and writer widths. In one embodiment, for each head in a collection of heat-assisted magnetic recording read/write heads, a reader width and a writer width is measured. A predicted life is determined for each head based on the respective reader width and writer width. In a first set of drives having relatively fewer heads per drive, a first subset of the heads having a higher value of the predicted life are used. In a second set of drives having relatively more heads per drive, a second subset of the heads having a lower value of the predicted life are used.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, information bits are recorded in a storage layer at elevated temperatures. The heated area (e.g., hotspot) in the storage layer determines the data bit dimension. One way to achieve tiny confined hot spot is to use an optical near-field transducer (NFT), such as a plasmonic optical antenna or an aperture, integrated in an optical waveguide of high contrast in the index of refraction between the waveguide core and its claddings.

Figure 1:
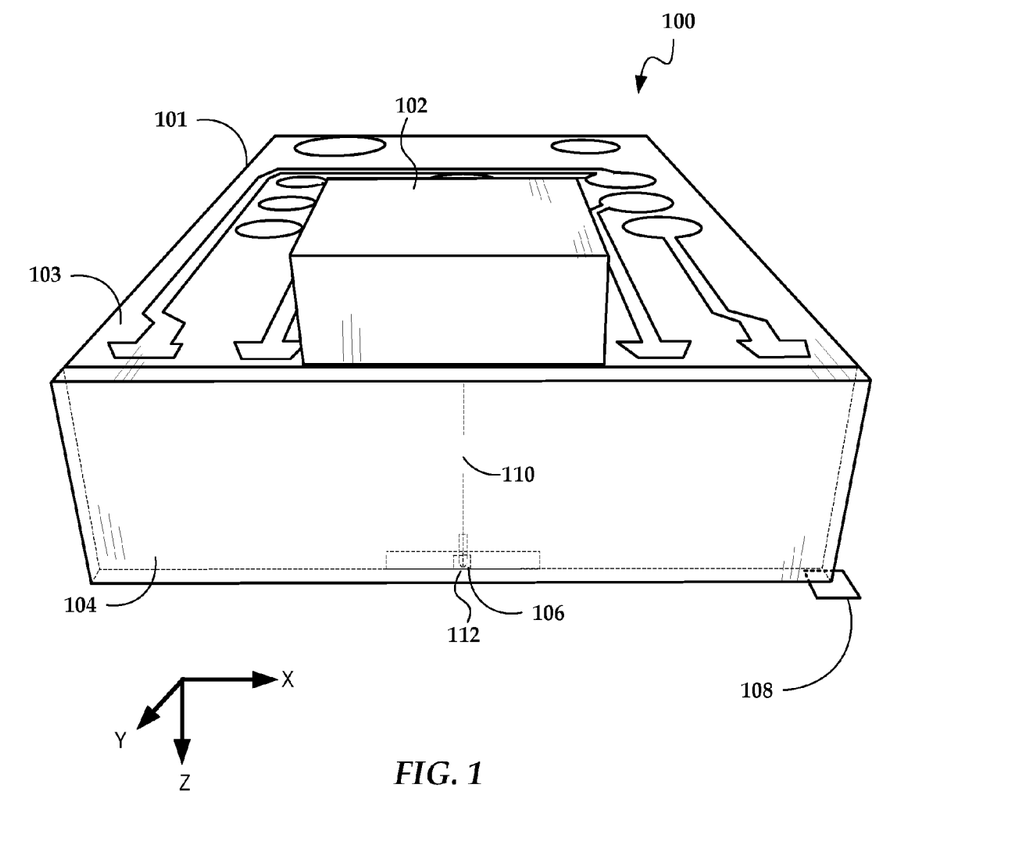
FIG. 1 is a perspective view of a slider assembly according to an example embodiment.

In reference to FIG. 1, a perspective view shows a HAMR recording head 100 according to an example embodiment. The recording head 100 may also be referred to as a slider, read head, write head, read/write head, etc. The recording head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer (NFT) 112. The NFT 112 is located near the read/write transducer 106 and causes heating of the media during recording operations. The NFT 112 may be made from plasmonic materials such as gold, silver, copper, rhodium, platinum, iridium, etc. A magnetic pole (not shown) is located in close proximity (e.g., 20-50 nm) to the NFT at the media-facing surface 108.

One challenge for HAMR products is NFT reliability. In the design phase of a hard drive product, it may be assumed the write power on hours (WPOH) for each head is the same for different capacity drives in the same product family. In reality, the work hour in the field is dependent on overall drive capacity. For example, a smaller capacity drive with fewer heads in the drive will experience relatively higher WPOH per head. A large capacity drive with more heads in the drive will experience relatively lower WPOH per head. In view of this, drive reliability for the different capacity drives can be increased by appropriate testing and selection of heads.

One way of differentiating read/write heads is by considering what is referred to herein as reader width and writer width. These widths are characteristic widths related to magnetic patterns written to or read from a recording medium. For example, writer width can be defined as the width of a track of data written by a HAMR write transducer at nominal settings of laser power, head-media clearance, and write coil current. In some embodiments, the measurement of writer width may include measuring write-plus-erase (WPE) width, which includes the track width plus erase bands on either side of the track. Reader width can be measured, for example, by performing a cross track scan of a track that has been trimmed to a particular width by first writing a test track then erasing edges on one or both sides until a desired track width is obtained.

Both HAMR head writer and reader width for a population of read/write heads have a distribution, and these distributions are independent due to the different transducers being created in different processing steps. These widths can be tested either after assembly of the slider (e.g., attachment of laser to slider) or at a higher level, e.g., head-gimbal assembly (HGA). For example, the electrical writer and reader widths can be measured on spinstand at fixed laser power and write triples (laser power, write current, and clearance actuator/heater current). Based on these spinstand results, heads can be sorted into a first group with wide writer width and narrow reader width and a second group with narrow writer width and wider reader width. The first group can be used drives with fewer heads (e.g., smaller capacity drives) and the latter can be used in drives with more heads (e.g., larger capacity drives). This can improve overall drive reliability and maximize yield.

Hard drive products are typically backed by a warranty, which provides a target life over which the likelihood of head failure should be minimized. Since each product has multiple capacity configurations, each head's workload during its target life is dependent on drive capacity. Small capacity drives have fewer heads such that each head will write and read more frequently than the head in the large capacity drive. Stated another way, for an operational unit of time T (where T is large, e.g., days, months), a drive with N heads uses each of its heads for an average time T/N. So if N is larger, each head in a drive with larger N is used for a lower fraction of T than for drives where N is smaller.

The relation between drive capacity and WPOH per head is shown in the example of Table 1 below which is for a particular class of drives that are primarily distinguished from one another by total capacity. It shows the smallest capacity drive having four times the WPOH for an equivalent life of the largest capacity drive. This indicates the heads of the smaller capacity drive needs greater reliability/durability, e.g., of the NFT and associated optical component, comparted to larger capacity drives.

TABLE 1

Example drive configuration

|  | 600 GB | 1.2 TB | 1.8 TB | 2.4 TB |
|---|---|---|---|---|
| # heads | 2 | 4 | 6 | 8 |
| WPOH per head | 4x | 2x | 1.33x | 1x |

Figure 2:
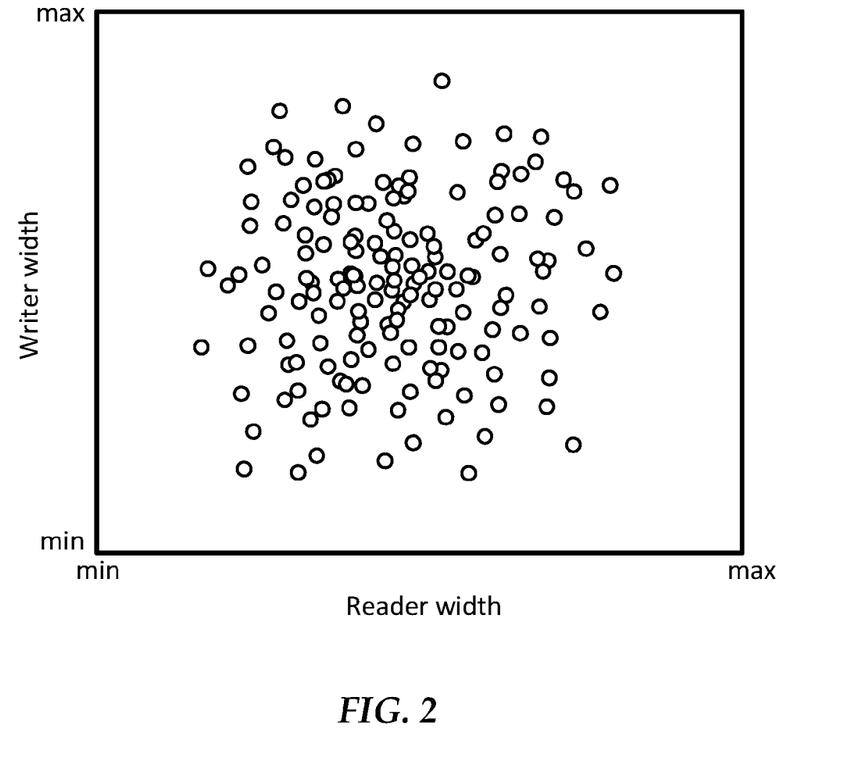
FIG. 2 is a graph showing distribution of writer and reader widths for a collection of heads according to an example embodiment.

Due to manufacturing process variations, both NFT and reader features that affect respective widths have a distribution, and they are independent since NFT and reader are fabricated at different steps. In FIG. 2, a graph shows a distribution of writer width and reader width for HAMR read/write heads according to an example embodiment. The graph shows the independent distribution between writer and reader width between minimum and maximum values. The distribution of points may, for example, be Guassian for both writer width and reader width.

Figure 3:
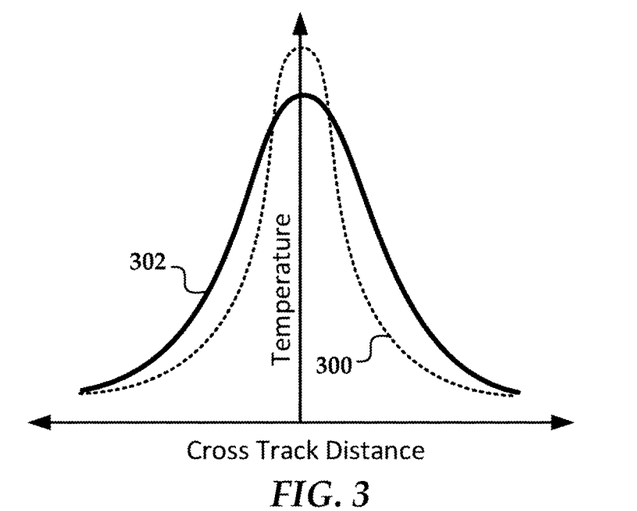
FIG. 3 is a graph showing different thermal profiles of read/write heads according to an example embodiment.
Figure 4:
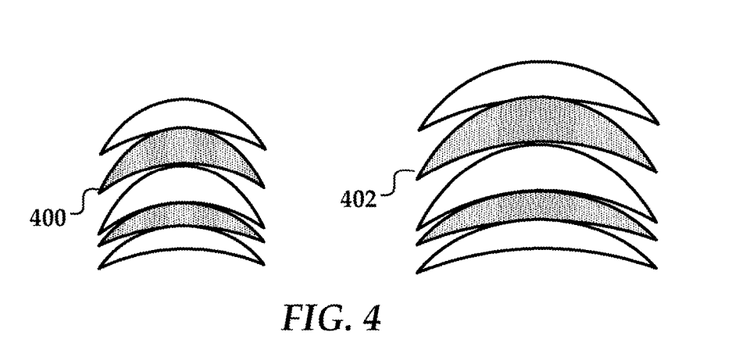
FIG. 4 is a block diagram illustrating different-width tracks written by read/write heads according to an example embodiment.
Figure 5:
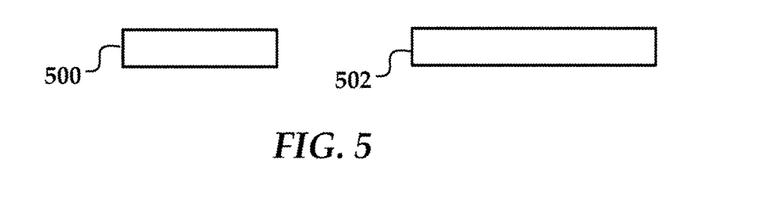
FIG. 5 is a block diagram illustrating different-width of read transducers of read/write heads according to an example embodiment.

Unlike perpendicular magnetic recording, where track width is mainly defined by physical write pole geometry, HAMR writer width can vary based on the amount of laser power applied to the media while recording. At the same laser power, a narrower NFT head will generate a relatively smaller thermal profile that results in a narrow track being written to the media. This is shown in the diagrams of FIGS. 3 and 4. In FIG. 3, a graph shows a comparative example of thermal profiles of respective narrower 300 and wider 302 NFT profiles. In FIG. 4, a diagram shows respective narrower 400 and wider 402 tracks written by via NFT having respective profiles 300, 302. In FIG. 5, a diagram shows readers with respective narrower 500 and wider 502 reader widths.

It is believed that NFT reliability is related to NFT temperature, e.g., a higher NFT working temperature results in shorter predicted NFT life. A narrow NFT head will generally use a lower laser power to write narrow tracks, and so will tend to have a longer predicted life. However, reader width will affect the final selected track density, which is done by writing data with variable bit aspect ratios (VBAR). Generally, setting VBAR involves changing a track width and linear bit length to achieve a target value of areal density and bit error rate (or other measure of data quality/reliability). The VBAR of each drive can be different to account for differing characteristics of its components, e.g., due to manufacturing tolerances.

Generally, a wide reader works best with a wide track due to transition curvature and side reading, as shown in FIG. 4. In order for a narrow NFT head to write wider tracks, the laser power is increased, and so NFT temperature also increases, which can reduce long-term NFT reliability. As such, heads with wide readers and narrow writers may experience shorter life. Conversely, a narrow reader can reliably read narrow tracks, allowing the laser power to be held nominal (for narrow writer) or reduced (for wide writer). In such a case, the NFT reliability and head life may be relatively better due to the relatively lower laser power used.

In order to increase overall drive reliability across a product line, the HAMR heads can be sorted into bins based on writer and reader widths. For purposes of this disclosure, the terms "bin," "sort X," and "subset" may be used interchangeably. The writer and reader width values can be obtained from spinstand electrical test results. For example, reader width can be determined by reading tracks of known dimensions (e.g., a trimmed track) at different servo offsets and analyzing, e.g., the amplitude of the read signal as a function of servo offset.

As mentioned before, the electrical writer width in HAMR is defined (at least in part) by NFT dimensions (e.g., peg width) and laser power, and not write pole width. As such, the writer width can be measured by using a fixed laser power to write three adjacent tracks (triplets) using a spinstand and measuring data (e.g., adjacent track interference) from one or more of the tracks to determine writer width. Another method to measure writer width is by writing a center track and then write the adjacent track +1 and track −1 with offsets toward the center track. The center track amplitude loss or BER loss due to the adjacent track writing can be measured to obtain writer width.

Figure 6:
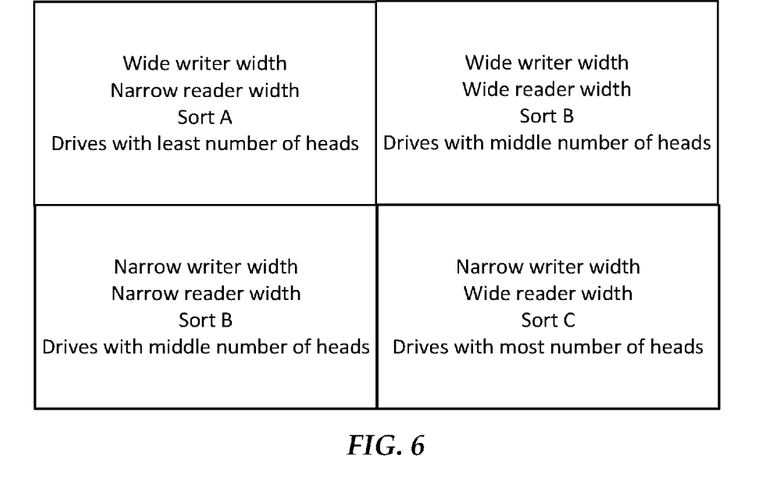
FIG. 6 is a block diagram illustrating a sorting criterion according to an example embodiment.

In FIG. 6, a chart illustrates an example sorting of heads. The measured value of writer width is divided into two groups (wide, narrow). The measured value of reader width is also divided into another two groups (wide, narrow). In this example, the heads are sorted into three bins based on these values: sort A, sort B and sort C. Sort A includes heads that have wide writer width and narrow reader width and are used in drives with the smallest number of heads per drive (e.g., lowest capacity drive). This is indicative of a higher value of predicted life of the NFT, which for this discussion is considered equivalent to the life of the head (even though the head may still be able to read data if the NFT has failed). In this case, the laser power can be kept low to create narrow tracks which can be read without adjacent track interference, which improves NFT reliability and therefore increases predicted life of the head. When the VBAR of the drive is set, a relatively high track density can be used for sort A heads.

Sort C includes heads with narrow writer width and wide reader width. This is indicative of a lower value of predicted life of the head/NFT. Heads from sort C are placed in the drives with the largest number of heads (e.g., highest capacity drive). In this case, VBAR test will select a relatively low track density that requires a higher laser power, which reduces NFT reliability. Generally, any heads not in sort A or sort C go into sort B. The drives using the sort B heads have a middle number of heads per drive, and include heads with 'matching' read/write widths (e.g., wide-reader/wide-writer, narrow-reader/narrow-writer). These heads will have a middle value of predicted life of the NFT/head.

The sorting methods described herein can also be used to distribute heads to drives based on other factors besides number of heads per drive. For example, if a drive is expected to experience high amounts of write workload over its life (e.g., used in applications such as personal computers, databases, etc.), such drives can use heads from sort A. If a drive is expected to have a low write workload (e.g., archiving or other write-once, read-many applications), the heads from sort C may suffice for that drive.

Figure 7:
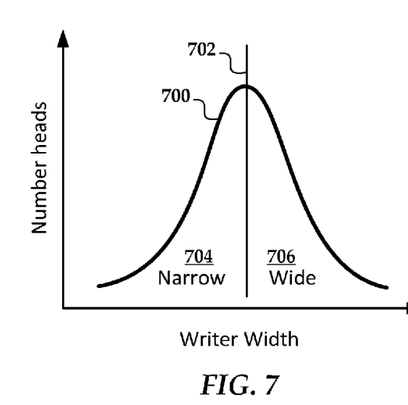
FIGS. 7 and 8 are graphs showing different ways of sorting heads according to writer width according to example embodiments.

There are a number of ways in which writer width and reader width can be characterized. For example, more than two groupings can be used, e.g., narrow, medium, wide, can be used for one or both of these metrics. The dividing lines between the groupings can also be determined in a number of ways. In FIG. 7, a graph illustrates how widths (writer width in this example) can be grouped according to an example embodiment. Curve 700 represents a distribution of writer width for a batch of read/write heads within an acceptable tolerance. Dividing line 702 represents an average or median of the distribution 700.

Heads with writer width to the left of the line 702 are classified as narrow 704 and heads with writer width to the right of the line 702 are classified as wide 706. This divides the writer width of the heads so that an equal (or approximately equal) number of heads are in both groupings 704, 706. Similar divisions may be used for more than two groups, e.g., evenly distributing two boundaries across the distribution 700 so that each of three groups has about 33% of the total number of heads. It will be understood that the groupings shown in FIG. 7 may be similarly applied to reader width.

Figure 8:
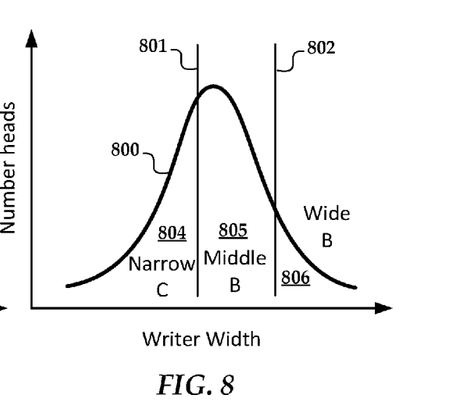

In other embodiments, it may be desirable to group the heads based on both the total number of heads, the number of drives, and the number of drives per heads. For example, consider a hypothetical manufacturing run of 30 drives where 10 drives will have 4 heads/drive, 10 drives will have 6 heads/drive, and 10 drives will have 8 heads/per drive. This will require 40+60+80=180 heads. Assuming the heads are sorted as shown in FIG. 6, 100 wide-writer width heads will be used (sort A and sort B) and 80 narrow-writer width heads will be used. In the graph of FIG. 8, a grouping of heads is shown according to this embodiment.

Curve 800 represents a distribution of writer width for a batch of the 180 read/write heads used in this scenario. Dividing line 801 is selected so that 80 of the 180 heads (44%) are classified as narrow-writer width 804. Dividing line 802 is selected so that 40 of the 180 heads (22%) are classified as wide-writer width 806. The remaining 60 heads with middle width are in group 805. This divides the writer width of the heads so that the required number of heads to meet the manufacturing requirements is in the respective groupings 804, 806.

This division shown in FIG. 8 may serve as a starting point, and further iterations may be performed to ensure both the writer width and the reader widths of the sorted heads meet the criteria shown in FIG. 6. For example, if a subset of heads initially sorted into group C also have relatively narrow reader widths, these may be swapped with a subset of heads initially sorted into group B that have the widest reader widths. Similarly, if a subset of heads initially sorted into group A have relatively wide reader widths, these may be swapped with a subset of heads initially sorted into group B that have the narrowest reader widths. A similar procedure may be performed by initially dividing the heads by reader width instead of writer width, e.g., sorting the heads into three initial groups of wide readers (sort C), narrow readers (sort A), and middle-width readers (sort B), and iterating to ensure the bins meet the requirements of FIG. 6.

In other embodiments, the read/write heads may be sorted based on a single metric that indicates a ratio of reader-to-writer width. For example, the graph of FIG. 9 uses a ratio of normalized writer to reader width as a sorting criterion according to an example embodiment. In this example, the minimum-to-maximum reader/writer widths for a collection of heads are both normalized to [0.5, 1.0], and denoted in the figure as normalized writer width (NWW) and normalized reader width (NRW). The right end of the graph represents wide writer, narrow reader, and so corresponds to sort A. The left end of the graph represents narrow writer, wide reader, and so corresponds to sort C. The middle corresponds to sort B. Generally, the value of NWW/NRW corresponds to an estimate of predicted head life. Other metrics may be used, e.g., difference between reader and writer width, normalized or otherwise.

Figure 9:
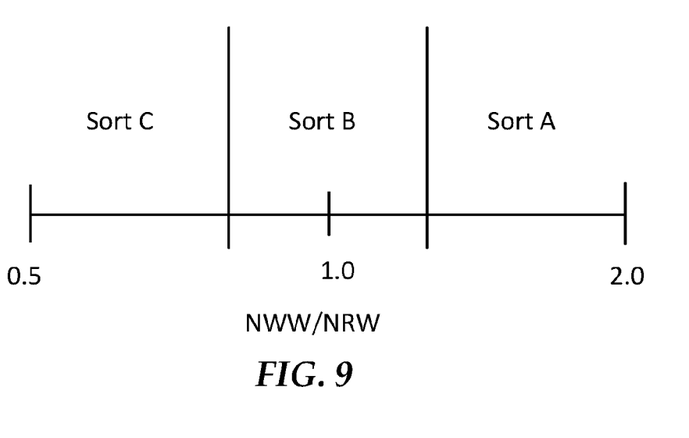
FIGS. 9 and 10 are graphs showing sorting heads according to additional example embodiments.
Figure 10:
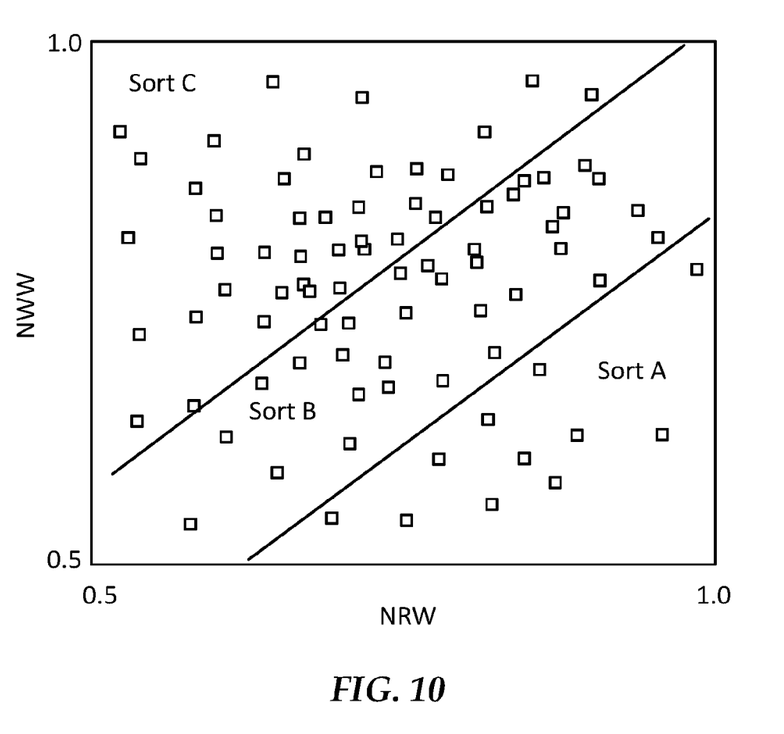

The divisions in FIG. 9 assume that NWW/NRW is evenly distributed throughout the population of tested heads and that the sizes of the bins are equal. As such, the sizes of the bins in the graph are approximately equal. The heads may have a non-uniform distribution of NWW/NRW and/or unequal bin sizes may desired, in which case the bin boundaries can be adjusted appropriately. In FIG. 10, a scatter plot shows a hypothetical distribution of NWW vs. NRW. The illustrated bins may be selected, e.g., by selecting a lines that divide the graph into the desired bin sizes. In this case, the bins are of unequal size, e.g., sort C>sort B>sort A.

Figure 11:
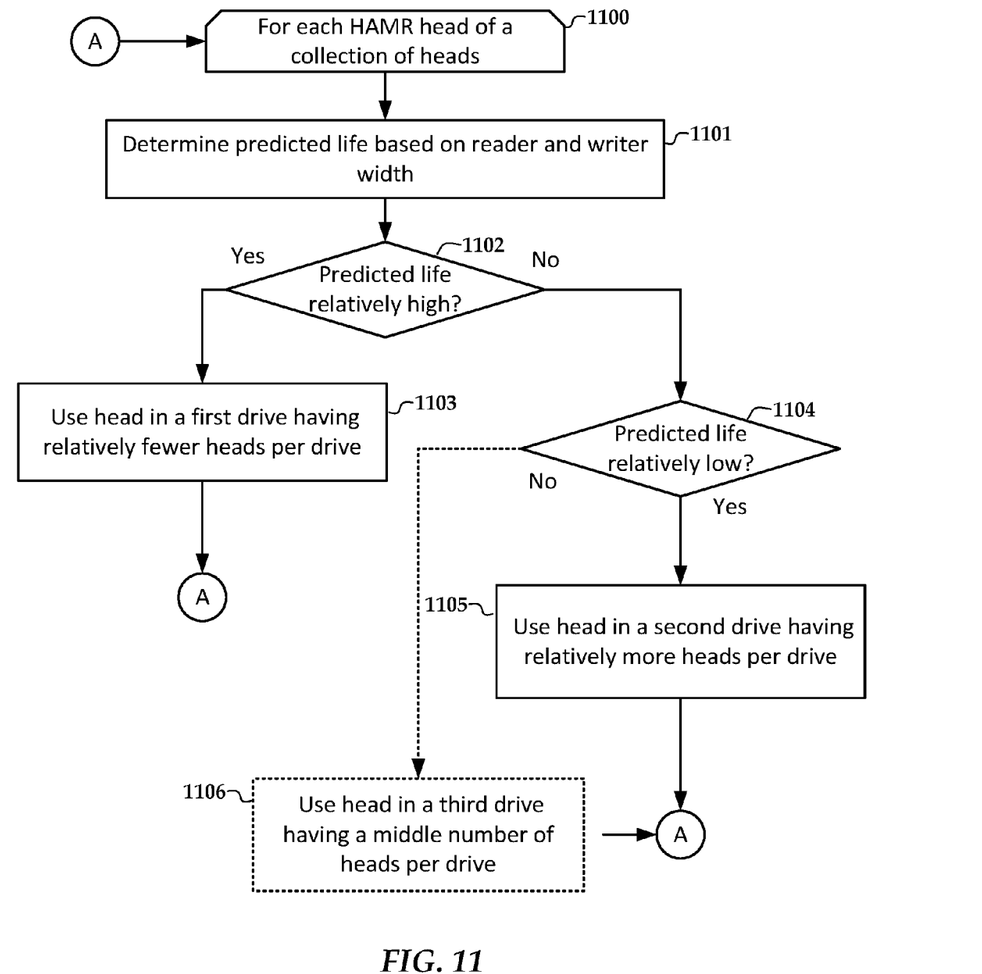
FIGS. 11, 12, and 13 are flowcharts illustrating methods according to example embodiments.

In FIG. 11, a flowchart illustrates a method according to an example embodiment. The method involves iterating through each head in a collection of heat-assisted magnetic recording read/write heads, as represented by loop limit 1100. For each head, a reader width and a writer width is measured and used to determine 1101 a predicted life. If it is found (block 1102) that the head has a higher value of the predicted life, then the head is used 1103 in a first drive having relatively fewer heads per drive. Otherwise, if it is found (block 1104) that the head has a lower value of the predicted life, then the head is used 1105 in a second drive having relatively more heads per drive (e.g., the drive in block 1105 uses more heads than used by the drive in block 1103). The criteria used in blocks 1102 and 1104 may be selected so that block 1104 always returns 'yes' if block 1102 returns 'no.' In an optional case, block 1104 can return 'no' (e.g., middle value of predicted life), in which case the head is used in a third drive having a middle number of heads.

Figure 12:
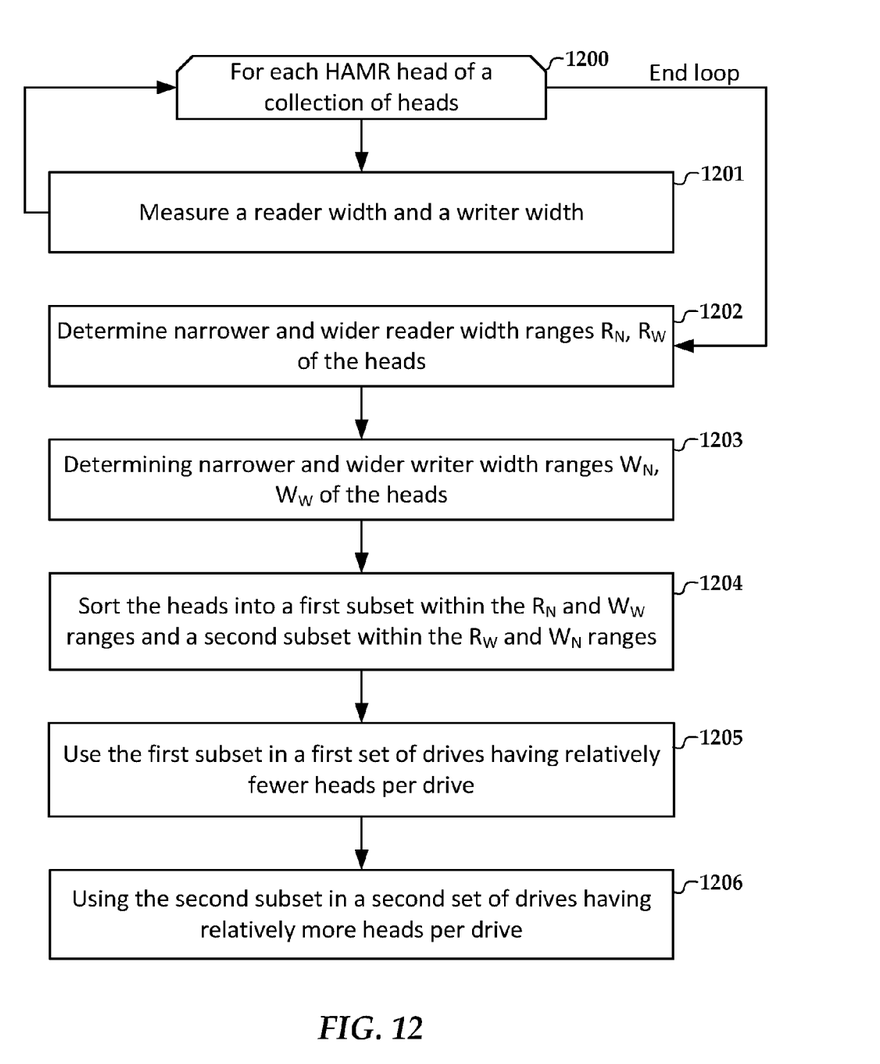

In FIG. 12, a flowchart illustrates a method according to another example embodiment. The method involves iterating through each head in a collection of heat-assisted magnetic recording read/write heads, as represented by loop limit 1200. For each head, a reader width and a writer width is measured 1201. The measurements are used to determine 1202 a narrower reader width range $R_N$ and a wider reader width range $R_W$ of the heads. The measurements are used to determine 1203 a narrower writer width range $W_N$ and a wider writer width range $W_W$ of the heads. The heads are sorted 1202 a first subset within the $R_N$ and $W_w$ ranges (i.e., the heads have respective reader and writer widths in these ranges), and a second subset within the $R_W$ range and e $W_N$ ranges. The first subset is used 1205 in a first set of drives having relatively fewer heads per drive. The second subset is used 1206 in a second set of drives having relatively more heads per drive.

Figure 13:
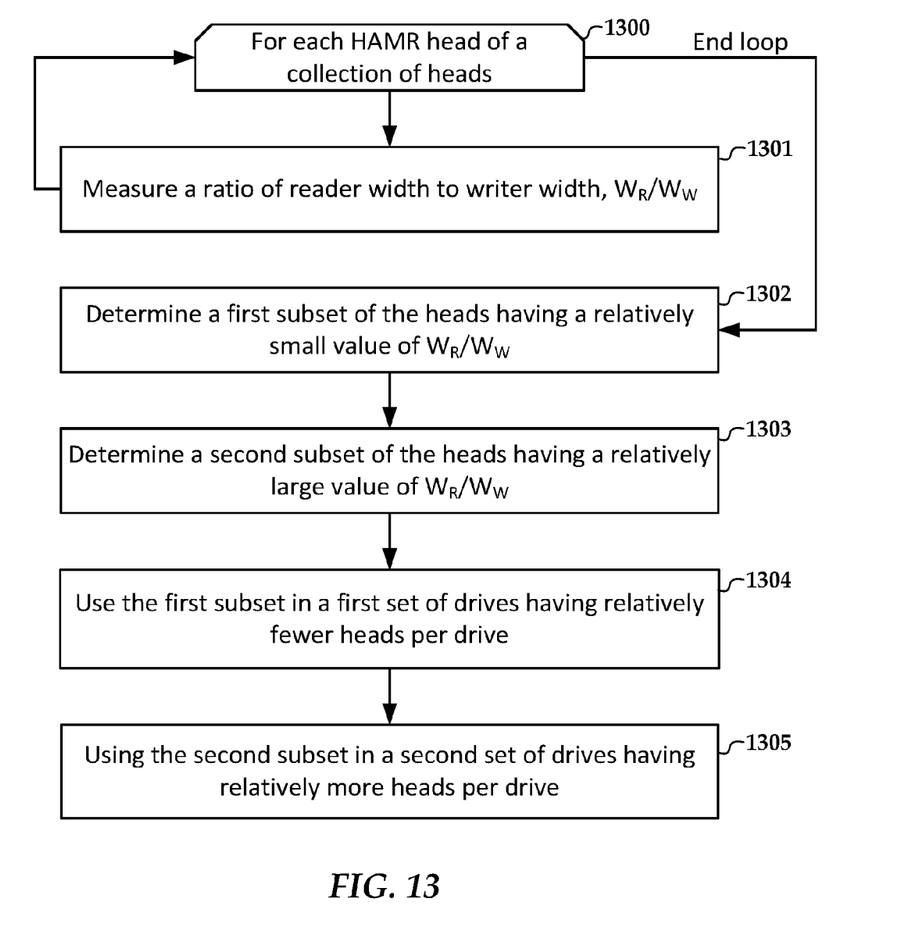

In FIG. 13, a flowchart illustrates a method according to another example embodiment. The method involves iterating through each head in a collection of heat-assisted magnetic recording read/write heads, as represented by loop limit 1300. For each head, a ratio of reader width to writer width (R/W) is measured 1301. A first subset of the read/write heads having a relatively small value of the ratio is determined 1302. A second subset of the read/write heads having a relatively large value of the ratio is determined 1303. The first subset of the heads is used 1304 in a first set of drives having relatively fewer heads per drive. The second subset of the heads is used 1305 in a second set of drives having relatively more heads per drive.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method, comprising:
    measuring, for each head in a collection of heat-assisted magnetic recording read/write heads, a reader width and a writer width;
    determine a predicted life for each head based on the respective reader width and writer width;
    based on the predicted life for each head, sort the collection into a first subset having greater than a first predicted life and a second subset having no greater than the first predicted life;
    in a first set of drives having no more than a first number of heads per drive, using heads from the first subset; and
    in a second set of drives having more heads per drive than the first number, using heads from the second subset.

2. The method of claim 1, wherein the predicted life for each head is based on a ratio of the respective reader width to the respective writer width, the first subset of the heads has a higher value of the ratio than the second subset of the heads.

3. The method of claim 1, further comprising:
    determining a first reader width range and a second reader width range of the read/write heads, first reader widths of the first reader width range being smaller than second reader widths of the second reader width range; and
    determining a first writer width range and a second writer width range of the read/write heads, first writer widths of the first writer width range being smaller than second writer widths of the second writer width range, the first subset of the heads being within the first reader width range and within the second writer width range, and the second subset of the heads within the second reader width range and within the first writer width range.

4. The method of claim 1, wherein, for an operational time period, the second set of drives uses each of its heads for a lower fraction of the operational time period than the first set of drives.

5. The method of claim 1, further comprising, in a third set of drives having a number of heads per drive between that of the first and second set of drives, using a third subset of the heads having a middle value of the predicted life between that of the first and second subset.

6. The method of claim 1, wherein the measuring of the reader widths and the writer widths is performed on a spinstand.

7. The method of claim 1, wherein measuring of the writer width comprises measuring a write-plus-erase width.

8. The method of claim 1, wherein the first predicted life is adjusted so that respective sizes of the first and second subsets correspond to a required number of the heads for the first and second sets of drives.

9. A method, comprising:
    measuring, for each head in a collection of heat-assisted magnetic recording read/write heads, a reader width and a writer width;
    determining a first reader width range and a second reader width range of the heads, first reader widths of the first reader width range being smaller than second reader widths of the second reader width range;
    determining a first writer width range and a second writer width range of the heads, first writer widths of the first writer width range being smaller than second writer widths of the second writer width range;
    sorting the heads into a first subset within the first reader width range and within the second writer width range, and a second subset within the second reader width range and within the first writer width range;
    using the first subset in a first set of drives having no more than a first number of heads per drive; and
    using the second subset in a second set of drives having more heads per drive than the first number.

10. The method of claim 9, wherein the second subset of heads has a lower predicted life than the first subset of heads.

11. The method of claim 9, wherein, for an operational time period, the second set of drives uses each of its heads for a lower fraction of the operational time period than the first set of drives.

12. The method of claim 9, further comprising:
    sorting the write heads that do not fall into the first and second subsets into a third subset; and
    using the third subsets in a third set of drives that has a number of heads per drive between that of the first and second set of drives.

13. The method of claim 9, wherein the measuring of the reader widths and the writer widths is performed on a spinstand.

14. The method of claim 9, wherein measuring of the writer width comprises measuring a write-plus-erase width.

15. A method, comprising:
    measuring, for each head in a collection of heat-assisted magnetic recording read/write heads, a ratio of reader width to a writer width;
    determining a first subset of the read/write heads having the ratio below a first value;
    determine a second subset of the read/write heads having the ratio greater than or equal to the first value;
    using the first subset in a first set of drives having no more than a first number of heads per drive; and using the second subset in a second set of drives having more heads per drive than the first number.

16. The method of claim 15, wherein the second subset of heads has a lower predicted life than the first subset of heads.

17. The method of claim 15, wherein, for an operational time period, the second set of drives uses each of its heads for a lower fraction of the operational time period than the first set of drives.

18. The method of claim 15, further comprising:
sorting the writer heads that do not fall into the first and second subsets into a third subset; and
using the third subsets in a third set of drives that has a number of heads per drive between that of the first and second set of drives.

19. The method of claim 15, wherein the measuring of the reader widths and the writer widths is performed on a spinstand.

20. The method of claim 15, wherein measuring of the writer width comprises measuring a write-plus-erase width.

* * * * *